United States Patent [19]
Ehrend

[11] Patent Number: 5,141,978
[45] Date of Patent: Aug. 25, 1992

[54] PROCESSING OF POLYURETHANE RUBBERS

[75] Inventor: Helfried Ehrend, Speyer, Fed. Rep. of Germany

[73] Assignee: Rhein Chemie Rheinau GmbH, Mannheim, Fed. Rep. of Germany

[21] Appl. No.: 692,534

[22] Filed: Apr. 29, 1991

[30] Foreign Application Priority Data

May 12, 1990 [DE] Fed. Rep. of Germany ....... 4015297

[51] Int. Cl.⁵ .............................................. C08L 75/04
[52] U.S. Cl. .................................... 524/306; 524/310; 524/311; 524/317; 524/318; 524/322
[58] Field of Search ............... 524/306, 310, 311, 317, 524/318, 322

[56] References Cited

U.S. PATENT DOCUMENTS

| | | | |
|---|---|---|---|
| 2,958,706 | 11/1960 | Hurwitz et al. | 260/488 |
| 3,402,135 | 9/1968 | Schwartz et al. | 260/22 |
| 3,423,347 | 1/1969 | Zawadzki et al. | 524/311 |
| 3,933,705 | 1/1976 | Olstowski | 260/18 |

FOREIGN PATENT DOCUMENTS 1200795 9/1965 Fed. Rep. of Germany.

*Primary Examiner*—Maurice J. Welsh
*Attorney, Agent, or Firm*—Connolly and Hutz

[57] ABSTRACT

An addition of 1 to 10% by weight and preferably 2 to 5% by weight, based on polyurethane rubber, of a fatty acid ester of pentaerythritol or a mixture of an alkane with a fatty acid to the polyurethane rubber mix eliminates the tendency towards sticking and improves the flow properties.

1 Claim, No Drawings

PROCESSING OF POLYURETHANE RUBBERS

Rubber articles of millable polyurethanes are aquiring increasing interest in the rubber industry by virtue of their excellent wear resistance and their very high resistance to swelling in oils. Elastomeric polyurethanes or polyurethane rubbers have been known for some time. They are segment polymers comprising soft segments (polyethers, polyesters) of relatively high molecular weight (for example 1,000 to 4,000) and hard segments (polyurethane or polyurea). The crosslinking of these unvulcanized rubbers with isocyanate, peroxide or sulfide to form rubber generally produces a connection or crosslink between the hard segments while the mostly unbranched soft segments determine the elastic properties.

Like natural rubber or typical synthetic diene rubbers for example, polyurethane rubbers can be processed on mills or in internal mixers. A rubber mix is generally prepared in the first processing step, i.e. carbon black, fillers, crosslinking agents and other auxiliaries are added to the polyurethane rubber. A pronounced tendency towards sticking and poor flow properties are observed both in this phase and in the subsequent production of moldings from the rubber mix, for example by extrusion, and during subsequent crosslinking.

The present invention is based on the discovery that an addition of 1 to 10% by weight and preferably 2 to 5% by weight, based on polyurethane rubber, of a fatty acid ester of pentaerythritol or a mixture of an alkane with a fatty acid to the polyurethane rubber mix eliminates the tendency towards adhesion and distinctly improves the flow properties. Not only does this facilitate the production of crosslinked rubber articles from the polyurethane rubbers, it actually makes the production of articles such as these possible for the first time in many cases. This applies in particular to small articles of complicated shape, such as for example complicated seals.

Polyurethane rubbers have long been known and are industrially used. As mentioned above, they are segment polymers comprising soft segments having a molecular weight of, for example, 1,000 to 4,000, which consist of aliphatic polyesters or polyethers, and hard segments containing urethane or urea groups. Products such as these can be obtained by reaction of a hydroxyl-terminated polyester or polyether with an excess of a diisocyanate to form an NCO-terminated prepolymer which is subsequently reacted with a short-chain diol or diamine for chain extension. For example, a suitable polyurethane rubber is formed from a mixed ester of adipic acid with ethylene glycol and propylene glycol terminated by OH groups and having a molecular weight of approximately 2,000 by reaction with an excess of tolylene diisocyanate or 4,4-diphenyl methane diisocyanate to form the NCO prepolymer and subsequent reaction with butanediol for chain extension.

The polyurethane rubbers are converted into polyurethane rubber mixes by the same methods which are used for natural rubber or synthetic diene rubbers. Other constituents of the rubber mixes are essentially fillers, preferably carbon blacks, and the crosslinking agent. In the case of polyurethane rubbers, the crosslinking agent may be a diisocyanate, a peroxide or sulfur. In sulfur crosslinking or vulcanization, a typical vulcanization accelerator is of course also necessary.

The additive according to the invention for improving the processing properties is an ester of pentaerythritol with aliphatic fatty acids, preferably saturated aliphatic fatty acids containing 6 to 24 carbon atoms. Pentaerythritol tetrastearate is particularly suitable. In addition to stearic acid for the pentaerythritol tetrastearate, other corresponding fatty acids may also be used, including for example pentaerythritol tetrapalmitate, pentaerythritol tetralaurate, etc. Apart from the tetraesters, it is also possible to use corresponding mono-, di- and triesters of the above-mentioned fatty acids and similar fatty acids, such as corresponding mixed esters. Instead of the pentaerythritol ester, is also possible to use a mixture of the free fatty acids, preferably saturated aliphatic fatty acids containing 6 to 24 carbon atoms and, more preferably, 16 to 18 carbon atoms with alkanes. Particularly suitable alkanes are isoalkanes containing from 20 to 60 carbon atoms and preferably from 35 to 50 carbon atoms. The ratio by weight of alkane to fatty acid in this mixture is from 95:5 to 20:80 and preferably of the order of 70:30.

The pentaerythritol esters or alkane fatty acid mixtures may be directly incorporated during production of the mix, in other words there is no need for a separate step in this regard. This addition reduces the sticking of the polyurethane rubber mix and also the viscosity of the mixture so that higher injection volumes and injection rates are achieved in the production of moldings by injection molding. At the same time, satisfactory demolding is obtained. The other properties of the crosslinked rubbers are not affected.

In the following examples, a few rubber mixes and their properties are shown in the form of a Table. The mixes were prepared in the usual way by mixing of the constituents on mills. A high-pressure capillary rheometer and a rheovulcameter were used for the measurements, their purpose and mode of operation being briefly described in the following. The following examples show that the viscosity of the rubber mixes is distinctly reduced while the injection volumes and injection rates into the vulcanizing mold are distinctly increased by the addition of pentaerythritol tetrastearate or the alkane fatty acid mixture. This results in a considerable improvement in the economic production of polyurethane moldings.

HIGH PRESSURE CAPILLARY RHEOMETER (HCR)

This instrument is used to test the rheological properties of rubber mixes and polymer blends.

BRIEF DESCRIPTION OF MEASUREMENT

The material to be tested is introduced into a cylinder and is forced through a die under defined conditions by means of a piston.

| Predetermined parameters: | Measured parameters: |
| --- | --- |
| Test temperature (°C.) | Melt temperature (°C.) |
| Piston speed (mm/s) | Melt pressure (bar) |
| | Test time (mins.) |

A computer additionally determines

| | |
| --- | --- |
| Apparent shear rate: | ap $(s^{-1})$ |
| Shear stress: | (Pa) |
| Apparent viscosity: | nap (Pa · s) |
| Flow exponent: | m |

| -continued | |
|---|---|
| Corrected shear rate: | (s⁻¹) |
| Corrected viscosity: | (Pa · s) |
| Normal stress coefficient: | (Pa · s²) |
| Normal stress difference: | (Pa) |
| Injection swelling | |

RHEOVULCAMETER

This instrument is used to test the processing behavior of rubber mixes (injection molding)

BRIEF DESCRIPTION OF MEASUREMENT

An accurately weighed sample of the mix is introduced into a storage compartment and, by means of a piston, is injected through a die into a heated test mold.

| Measured parameters: | Predetermined parameters: |
|---|---|
| Injection volume (cm³) | Injection pressure (bar) |
| Injection rate (cm³/s) | Preheating temperature (°C.) |
| | Pre-pressure time (s) |
| | Preheating time (s) |
| | Injection time (s) |
| | Vulcanization temperature (°C.) |
| | Vulcanization time (mins.) |

EXAMPLE 1

| Mix | A | B | C |
|---|---|---|---|
| | Parts by weight | | |
| Polyurethane rubber* | 100 | 100 | 100 |
| Stearic acid | 0.5 | 0.5 | 0.5 |
| Polycarbodiimide mixture | 6 | 6 | 6 |
| Carbon black (N-300) | 20 | 20 | 20 |
| 2,4-tolylene diisocyanate | 10 | 10 | 10 |
| Pb phenyl ethyl dithiocarbamate | 0.3 | 0.3 | 0.3 |
| Pentaerythritol tetrastearate | — | 3 | — |
| Alkane/fatty acid mixture (70:30) | — | — | 3 |
| Viscosity of mix using a high-pressure capillary rheometer s 10³ (Pa · s) | | | |
| at γ  11 | 30 | 23.8 | 18.1 |
| 65 | 8.1 | 6.3 | 5.6 |
| 112 | 5.6 | 4.3 | 3.9 |
| 338 | 2.4 | 1.9 | 1.8 |
| 675 | 1.4 | 1.1 | 1.1 |
| Rheovulcameter measurement (injection molding) Injection conditions 25 s/65 bar/135° C. | | | |
| Volume (cm³) | 1.01 | 1.53 | 1.78 |
| Rate (cm³/s) | 0.042 | 0.061 | 0.072 |
| Vulcanizate data (10 mins./135° C.) | | | |
| Hardness (Shore A) | 80 | 81 | 80 |
| Elasticity (%) | 41 | 41 | 41 |
| Tensile strength (MPa) | 30.5 | 33.1 | 32.8 |
| Elongation at break (%) | 605 | 610 | 605 |
| Compression set | | | |
| After 24 h/100° C. (%) | 41 | 40 | 37 |
| After 24 h/125° C. (%) | 51 | 42 | 46 |

*of adipic acid-ethylene glycol/propylene glycol mixed ester, tolylene diisocyanate and butanediol (Urepan 600, a product of Bayer AG)

EXAMPLE 2

| Mix | A | B | C |
|---|---|---|---|
| | Parts by weight | | |
| Polyurethane rubber* | 100 | 100 | 100 |
| Polycarbodiimide mixture | 5 | 5 | 5 |
| Carbon black (N550) | 20 | 20 | 20 |
| Triallyl cyanurate | 2 | 2 | 2 |
| Di-tert. butyl peroxybenzene | 7 | 7 | 7 |
| Pentaerythritol tetrastearate | — | 3 | — |
| Alkane/fatty acid mixture (70:30) | — | — | 3 |
| Viscosity of mix using a high-pressure capillary rheometer s 10³ (Pa · s) | | | |
| at γ  11 | 36.9 | 31.2 | 32 |
| 65 | 8.9 | 4 | 4.3 |
| 112 | 6.1 | 3.2 | 3.3 |
| 338 | 2.6 | 2.2 | 2.2 |
| 675 | 1.6 | 1.6 | 1.6 |
| Rheovulcameter measurement (injection molding) Injection conditions 25 s/65 bar/5 mins. | | | |
| Volume (cm³) | 0.4 | 2.07 | 2.4 |
| Rate (cm³/s) | 0.02 | 0.1 | 0.12 |
| Vulcanizate data (30 mins./160° C.) | | | |
| Hardness (Shore A) | 75 | 74 | 72 |
| Elasticity (%) | 39 | 38 | 37 |
| Tensile strength (MPa) | 24 | 23.9 | 25 |
| Elongation at break (%) | 215 | 255 | 280 |
| Compression set | | | |
| After 24 h/100° C. (%) | 3 | 3 | 3 |
| After 24 h/125° C. (%) | 9 | 9 | 9 |

*of adipic acid-ethylene glycol/propylene glycol mixed ester, 4,4'-diphenyl methane diisocyanate and butanediol (Urepan 600, a product of Bayer AG)

EXAMPLE 3

| Mix | A | B | C |
|---|---|---|---|
| | Parts by weight | | |
| Polyurethane rubber* | 100 | 100 | 100 |
| Zn stearate | 0.25 | 0.25 | 0.25 |
| Carbon black (N330) | 20 | 20 | 20 |
| Polycarbodiimide mixture | 4 | 4 | 4 |
| Mercaptobenzthiazole (80%) | 3 | 3 | 3 |
| Mercaptobenzthiazole disulfide (80%) | 5 | 5 | 5 |
| Sulfur | 1.75 | 1.75 | 1.75 |
| Zn chloride/mercapto complex | 0.85 | 0.85 | 0.85 |
| Pentaerythritol tetrastearate | — | 3 | — |
| Alkane/fatty acid mixture (70:30) | — | — | 3 |
| Viscosity of mix using a high-pressure capillary rheometer s 10³ (Pa · s) | | | |
| at γ  11 | 38 | 33.5 | 19.4 |
| 65 | 10.3 | 7.2 | 8.3 |
| 112 | 6.9 | 5.5 | 6.2 |
| 338 | 3.1 | 3.1 | 3.1 |
| 675 | 1.9 | 1.9 | 1.9 |
| Rheovulcameter measurement (injection molding) Injection conditions 25 s/65 bar/160° C. | | | |
| Volume (cm³) | 0.65 | 1.88 | 1.59 |
| Rate (cm³/s) | 0.026 | 0.077 | 0.063 |
| Compression set | | | |
| After 24 h/100° C. (%) | 19 | 18 | 18 |
| After 24 h/125° C. (%) | 32 | 31 | 32 |

*Polyadduct of tolylene diisocyanate and polyester (Urepan 0359, a product of Bayer AG)

I claim:

1. A polyurethane rubber mix containing 1 to 10% by weight, based on polyurethane, of a fatty acid ester of pentaerythritol or a mixture of an alkane and a saturated fatty acid.

* * * * *